(12) United States Patent
Sugimoto et al.

(10) Patent No.: US 7,733,269 B2
(45) Date of Patent: Jun. 8, 2010

(54) POSITIONING APPARATUS AND POSITIONING SYSTEM

(76) Inventors: Sueo Sugimoto, 6-1-5 Higashinakahama, Joto-ku, Osaka-shi, Osaka 536-0023 (JP); Yukihiro Kubo, 3-9-5 Nishihama, Wakayama-shi, Wakayama 641-0036 (JP)

( * ) Notice: Subject to any disclaimer, the term of this patent is extended or adjusted under 35 U.S.C. 154(b) by 70 days.

(21) Appl. No.: 11/913,623

(22) PCT Filed: May 9, 2006

(86) PCT No.: PCT/JP2006/309277

§ 371 (c)(1),
(2), (4) Date: Nov. 5, 2007

(87) PCT Pub. No.: WO2006/121023

PCT Pub. Date: Nov. 16, 2006

(65) Prior Publication Data

US 2009/0091494 A1     Apr. 9, 2009

(30) Foreign Application Priority Data

May 9, 2005      (JP) ............................. 2005-135573

(51) Int. Cl.
*G01S 1/02* (2006.01)
*G01S 5/14* (2006.01)
(52) U.S. Cl. .............................. 342/357.12; 342/357.04
(58) Field of Classification Search ............ 342/357.02, 342/357.04, 357.09, 357.12, 357.15; 701/207, 701/214
See application file for complete search history.

(56) References Cited

U.S. PATENT DOCUMENTS

| 5,899,957 A | * | 5/1999 | Loomis ..................... 701/214 |
| 6,373,432 B1 | * | 4/2002 | Rabinowitz et al. .... 342/357.16 |
| 2003/0154049 A1 | | 8/2003 | Toda |

FOREIGN PATENT DOCUMENTS

| JP | 10-253734 | 9/1998 |
| JP | 2003-232845 | 8/2003 |
| JP | 2004-170290 | 6/2004 |

OTHER PUBLICATIONS

International Search Report for corresponding Application No. PCT/JP2006/309277 dated Jul. 11, 2006.

(Continued)

*Primary Examiner*—Dao L Phan
(74) *Attorney, Agent, or Firm*—Renner, Otto, Boisselle & Sklar, LLP

(57) ABSTRACT

A mobile station (1) gets the carrier phase integration values and the code pseudorange which is based on the satellites' data transmitted from the satellites (SAT1-SATn). The mobile station (1) gets the data including the delay data of the ionosphere from a navigation message. And the mobile station (1) gets the data including the delay data of the ionosphere from data transmitted from a base-station, and fits data together. Utilizing these data from the two data sources, the mobile station (1) sets one linear regression equation and estimates the own position.

6 Claims, 6 Drawing Sheets

OTHER PUBLICATIONS

Tatsunori Sada; "GPS Sokuryo-Gijutsu"; ohmsha, Oct. 20, 2003; p. 37-53.

Wu Chen; "Precise Estimation of Absolute Ionospheric Delay Based on GPS Active Network"; ION GNSS 2004; Sep. 21, 2004; pp. 420-427 (see p. 422, eq. (1) to (4).

Jinling Wang; "Mathematical Models for Combined GPS and GLONASS Positioning"; ION GPS 98; Sep. 15, 1998; pp. 1333-1344 (see p. 1335, left column, lines 1 to 26).

James W. Sinko; "Single-Epoch Ambiguity Resolution for Highway and Racetrack Applications"; ION GPS 2001, Sep. 11, 2001; pp. 1575-1583 (see p. 1577, eq. (1)).

N.F. Jonkman; "The Geometry-Free Approach to Integer GPS Ambiguity Estimation"; ION GPS 98, Sep. 15, 1998; pp. 369-379 (see p. 370, right column).

* cited by examiner

POSITIONING APPARATUS AND POSITIONING SYSTEM

TECHNICAL FIELD

This invention relates to positioning apparatus configured to estimate a receiver's position by utilizing the satellite signals, especially differential positioning apparatus configured to make estimation by utilizing information transmitted from a base-station, and relates to positioning system which includes this positioning apparatus.

BACKGROUND ART

Various types of a positioning apparatus which estimates a position utilizing the satellite signals from the satellite are disclosed. There are two kinds of the positioning methods for the positioning apparatus. One is a point positioning and the other is a differential positioning. On the differential positioning, a correction value which is related to the estimation of the receiver's position is set by a observational result estimated by the base-station whose position has been known. The positioning apparatus makes estimation by utilizing this correction value. In this estimation the various types of methods to eliminate an influence of an ionosphere and a troposphere are disclosed. One method sets a delay of the ionosphere and the delay of the troposphere to "0" at initial condition. And the other method estimates these delays utilizing a phase difference such as a single phase difference.

Tatsunori Sada, [GPS Sokuryo-Gijutsu], ohmsha, Oct. 20, 2003, p. 37-53

DISCLOSURE OF THE INVENTION

Problems to be Solved by the Invention

If we use a known estimation with the single phase difference or a double phase difference by utilizing a code pseudorange, a carrier phase integrated value, a delay data of the ionosphere, and a delay data of the troposphere, an estimation accuracy could be higher than the accuracy estimated only utilizing the code pseudorange. But an estimation process would be complex because the single phase difference processing and the double phase difference processing is used in the estimation process. And the estimation result would be varied more widely depending on a setting of a noise after the single phase difference processing and the double phase difference processing. So even though the estimation process is complicated, the estimation result could not have so high accuracy and an estimation processing speed could be slow.

A feature of the invention is to provide the positioning apparatus that estimates the receiver's position with high accuracy and without a complicated estimation process.

Means for Solving Problem

A positioning apparatus comprises a satellite signal receiver, a base-station data receiver, and a position estimating device. The satellite signal receiver receives satellites' signals transmitted from the satellites. The base-station data receiver receives a base-station positioning data from a base-station. The position estimating device observes code pseudoranges and carrier phase integration values at the satellite signal receiver and the satellites by utilizing satellite data got by the satellite signal receiver. The position estimating device sets up unknown values which includes integer ambiguity at the satellite signal receiver and the base-station, clock errors at the satellite signal receiver and the base-station, delays of an ionosphere at the satellite signal receiver and the base-station, delays of an troposphere at the satellite signal receiver and the base-station. The position estimating device linear-approximates a position of the satellite signal receiver with a Linear Taylor series expansion about estimated positions of the satellite signal receiver. The position estimating device sets up explanatory variables that include the integer ambiguities, the clock errors, the delays of the ionosphere, the delays of the troposphere, and the position of the satellite signal receiver. The position estimating device sets up objective variables that include the carrier phase integration values, and the code pseudoranges observed by the satellite signal receiver and the base-station. The position estimating device derives only one linear regression equation which includes the objective variables and the explanatory variables. The position estimating device estimates the position of the satellite signal receiver.

In this aspect, the satellite signal receiver gets the carrier phase integration values and code pseudoranges which are related to the satellites and the positioning apparatus as an observable values. The base-station data receiver gets the carrier phase integration values and code pseudoranges which are related to the satellites and the base-station as a received data by utilizing the data transmitted from the base-station. The position estimating device sets the position of the receiver (positioning apparatus) in three dimension, the clock errors of the receiver and the base-station, the integer ambiguity which based on the relation of the satellites and the receiver or the relation of the satellites and the base-station, and the delay of the ionosphere and the troposphere which are related to the receiver and the base-station to the unknown values. The position estimating device derives only one linear regression equation which includes the observable values as an objective variable and the unknown values as an explanatory variable. By processing this linear regression equation every epoch, the unknown values are estimated.

The position estimating device fixes the integer ambiguity by using an estimation of the integer ambiguity such as the LAMBDA method, and estimates the position of the satellite signal receiver.

In this aspect, applying the estimation of the integer ambiguity such as the LAMBDA method to the integer ambiguities, the integer ambiguities are fixed. This fixed integer ambiguities are substituted to the linear regression equation as a predetermined value, so the number of unknown values in the regression equation decreases and an accuracy of the estimation is higher.

The position estimating device applies the Kalmann Filter to the linear regression equation.

In this aspect, applying the Kalmann Filter, not only a fixed receiver's position but also a moving receiver's position could be estimated.

The position estimating device calculates a difference value of the integer ambiguities at the satellite signal receiver and the base-station, a difference value of the delay of the ionosphere at the satellite signal receiver and the base-station, and a difference value of the delay of the troposphere at the satellite signal receiver and the base-station, and apply at least one difference value to the linear regression equation.

In this aspect, using the difference values, the unknown values of the linear regression equation consists of the receiver's position and the difference values of the clock error, the difference values of the each carrier waves' integer ambiguities, the difference values of the delay of the ionosphere, the difference values of the delay of the troposphere. The unknown values are simplified and decrease.

A positioning system comprise the positioning apparatuses according to the claim 1. The base-station is a virtual base-station set near the positioning apparatus based on the base-station positioning data which are got at least three existing base-stations. One of the existing base-station sets the unknown values and the observed values of the linear regression equation based on the estimated position of the satellite signal receiver. The base-station data receiver receives data got from the existing base-station, the position estimating device estimates the position.

In this aspect, the base-station is set not only the existing base-station but also the virtual base-station which is set by the data of at least three existing base-stations. And the data from the base-station could be the data from the virtual base-station. In this case the position of the virtual base-station could be set around the true position of the receiver which is derived from the estimated receiver's position. Though the data of the virtual base-station is transmitted from the existing base-station, the content of data is based on the virtual base-station. The positioning apparatus estimates the linear regression equation, applying the data which is received by the base-station data receiver from the virtual base-station set around the positioning apparatus and the observable values got by satellite signal receiver. Consequently, the data applying to the linear regression equation at the positioning apparatus from the base-station is regarded as the data of the extremely near base-station.

The data related to the virtual base-station is set on the basis of the weights proportioned by the exponential in inverse of the distance between the virtual base-station and the existing base-station.

In this aspect, the position of the virtual base-station is set by at least three existing base-stations. But the position of the virtual base-station is set by the virtual data transmitted form the virtual base-station weighting proportioned by the exponential in inverse of the distance between the virtual base-station and the existing base-station. Herewith the phase integration value and the code pseudorange which are received at the virtual base-station are calculated.

EFFECTS OF THE INVENTION

According to this invention, only utilizing a regression equation, the estimation result on the differential positioning could have high accuracy. And this estimation process uses only one regression equation, so the estimation process could be simpler, and the receiver's position could be estimated quickly in a short estimation process.

In another aspect of the invention, applying the estimation of the integer ambiguity such as the LAMBDA method, the estimation result could have higher accuracy.

In another aspect of the invention, applying the Kalmann Filter, not only a fixed receiver's position but also a moving receiver's position could be estimated.

In another aspect of the invention, by calculating the estimation results and the accuracies of the differential positioning estimations depending to the base-stations located around the moving receiver, and by integrating the estimation results, the moving receiver's position could be estimated with high accuracy.

In another aspect of the invention, setting the virtual base-station around the receiver whose position is estimated and viewing the virtual base-station as the existing base-station, the distances between the receiver and the base-stations, the estimation result on the differential positioning could be higher accuracy.

In another aspect of the invention, setting the positioning data of the virtual base-stations on the basis of the weights proportioned by the exponential in inverse of the distance between the virtual base-station and the existing base-station, the positioning data of the virtual base-stations could be set with high accuracy. So processing the regression equation with the positioning data of the virtual base-stations set like above, the estimation result of the differential positioning could have very higher accuracy.

EXPLANATION OF REFERENCE NUMBERS

1 a mobile station, 10A an antenna receiving the satellite signals, 10B an antenna receiving the positioning data, 11 a GPS receiver, 12 a navigation message analysis device, 13 a satellite information processing device, 14 a base-station communication device, 15 a position operating device, 16 a control device, 2 base-station, 20A an antenna receiving the satellite signals, 20B an antenna receiving the positioning data, 200 a virtual base-station, SAT1-SATn a positioning satellite

THE BEST MODE FOR CARRYING OUT THE INVENTION

With reference to the accompanying drawings, an embodiment of the invention which is a positioning apparatus will be described below. The following explanation of the embodiment explains GPS (Global Positioning System), but could apply to other all GNSS (Global Navigation Satellite System).

Figure 1:
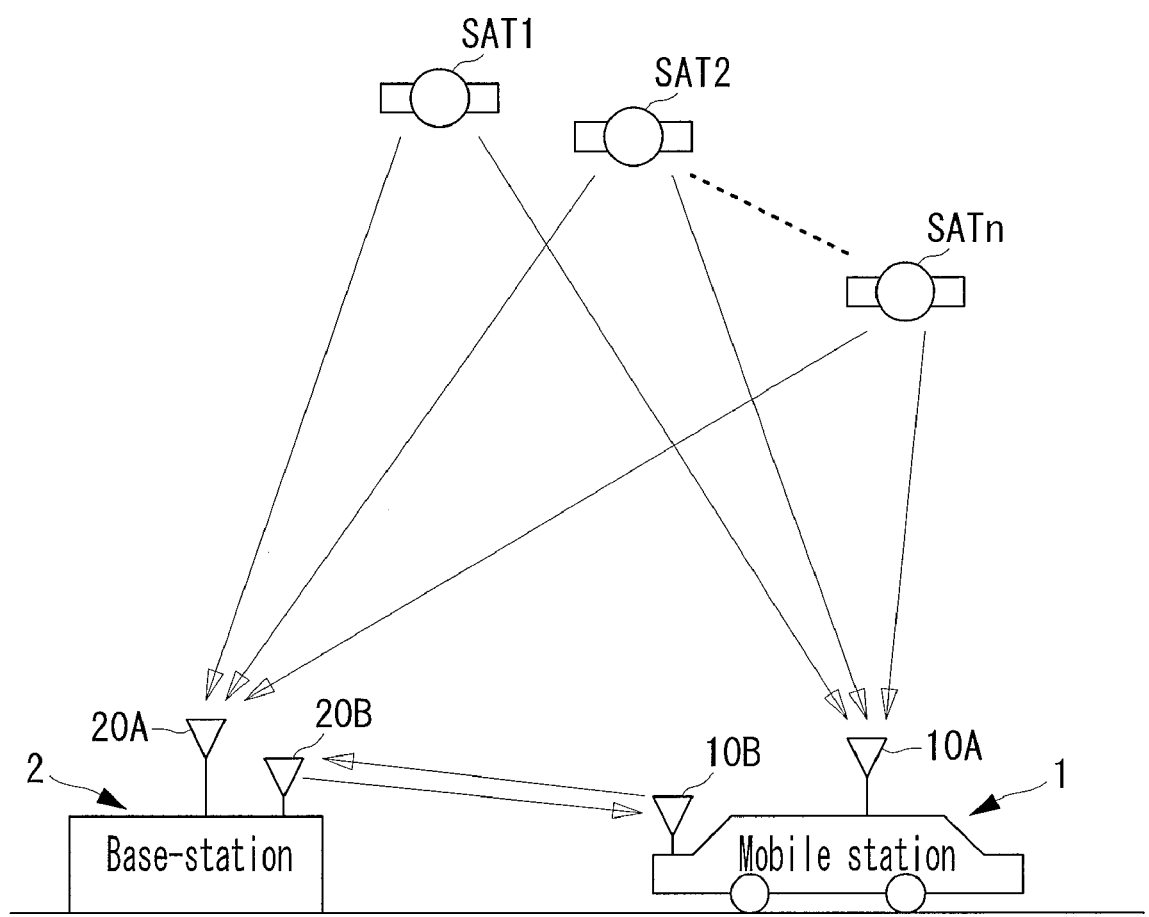
FIG. 1 is a conceptual diagram illustrating the positioning system including the positioning apparatus.

FIG. 1 is a conceptual diagram illustrating the positioning system including the positioning apparatus.

The positioning system described in this embodiment includes a mobile station 1 which is correspond to the positioning apparatus of this invention, a base-station 2, and a plurality of the positioning satellite SAT1-SATn.

The plurality of the positioning satellites SAT1-SATn transmits a carrier signal superimposed a navigation message. The carrier signal is modulated by a known code which is unique for each positioning satellite.

The base-station 2 includes an antenna receiving the satellite signals 20A and an antenna receiving the positioning data. And the base-station 2 includes a GPS receiver, a satellite information processing device, and communication device, which are not shown in the figure. The antenna receiving the satellite signals 20A receives the satellite signals which are transmitted from the observable positioning satellites. The GPS receiver demodulates the satellite signals. The satellite information processing device analyzes these satellite signals and calculates the carrier phase integrated values and the code pseudorange. And the satellite information processing device gets a delay data of an ionosphere, a delay data of a troposphere, the clock errors of the satellites, and an orbit data of the satellites from the navigation message. The communication device makes the base-station positioning information from data described above and transmits this information to the mobile station 1.

Figure 2:
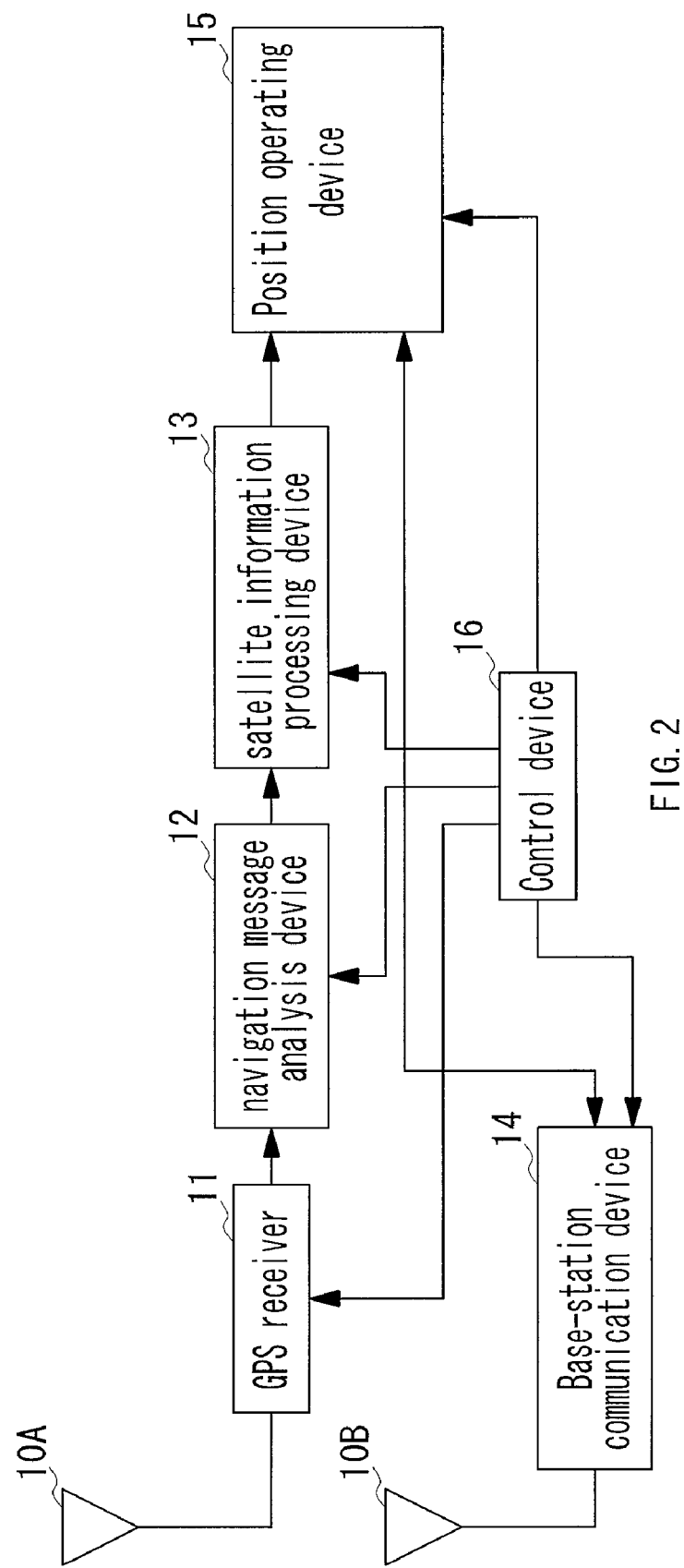
FIG. 2 is a block diagram illustrating an embodiment of the positioning apparatus.
Figure 3:
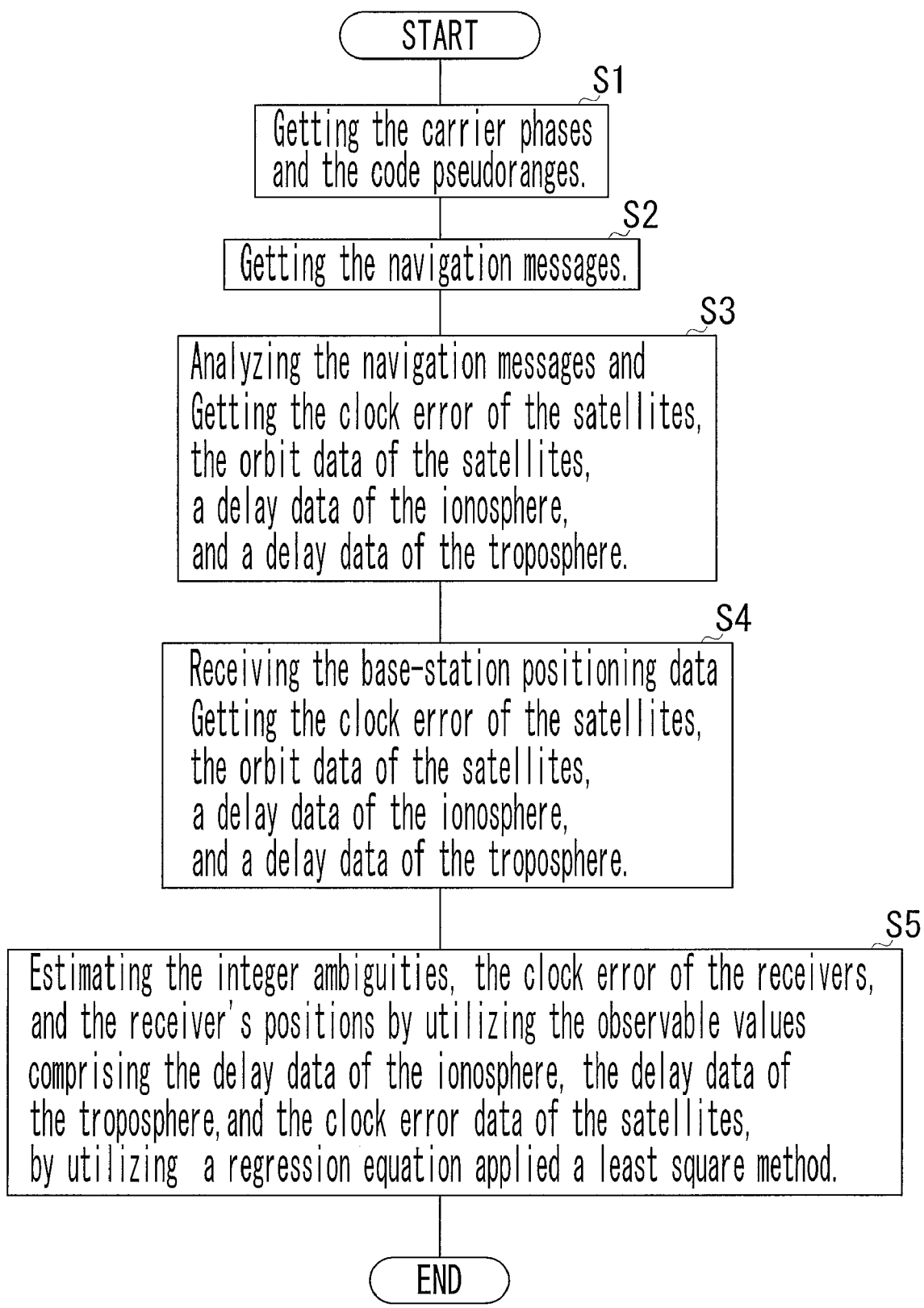
FIG. 3 is a flowchart illustrating the estimation process in the positioning apparatus.

FIG. 2 is a block diagram illustrating an embodiment of the positioning apparatus. FIG. 3 is a flowchart illustrating the estimation process in the positioning apparatus.

The mobile station 1 includes an antenna receiving the satellite signals 10A, an antenna receiving the positioning data 10B, a GPS receiver 11, a navigation message analysis device 12, a satellite information processing device 13, a base-station communication device 14, a position operating device 15, and a control device 16 which controls all device of the mobile station.

The antenna receiving the satellite signals 10A receives the satellite signals which are transmitted from the observable positioning satellites. The GPS receiver 11 demodulates the satellite signals and output the navigation message. In parallel to this demodulation the GPS receiver 11 calculates the carrier phase integrated values and the code pseudorange (S1). The navigation message analysis device 12 analyzes the navigation message demodulated from the satellite signal and gets the delay data of the ionosphere, the clock errors of the satellites, and the orbit data of the satellites (S2, S3). In reference to an ephemeris data, the satellite information processing device 13 chooses the satellites utilized for the positioning estimation. The satellite information processing device 13 outputs the clock errors of the chosen satellites and the delay data of the ionosphere to the position operating device 15. The satellite information processing device 13 outputs a delay data of the troposphere which is got from external equipment or calculated in this apparatus to the position operating device 15.

Meanwhile, the antenna receiving the positioning data 10B receives the base-station positioning information transmitted from a predetermined base-station. For example, the predetermined base-station is defined by the nearest base-station of the mobile station. The base-station communication device 14 analyzes the base-station positioning information and gets the carrier phase integrated values of the base-station, the code pseudorange of the base-station, the delay data of the ionosphere of the base-station's position, the delay data of the troposphere of the base-station's position, and the clock errors of the satellites. And the base-station communication device 14 output these data to the positioning operating device 15 (S4). On this occasion if the satellite information processing device 13 gets the clock errors of the satellites, the base-station communication device 14 need not to get the errors of the satellites.

The positioning operating device 15 fits the data inputted from the satellite information processing device 13 and the data inputted from the base-station communication device 14 for the utilized satellites. More specifically the positioning operating device 15 relates the data got by the mobile station 1 and the data got by the base-station 2 to the observable satellites SAT1-SATn. And the positioning operating device 15 collects up the group data of each satellite SAT1-SAtn. The positioning operating device 15 derives a regression equation described below applying the inputted data which are defined as the observed values. The observed values includes the carrier phase integrated values, the code pseudoranges, the clock errors of the satellites, the delay data of the ionosphere,
and the delay data of the troposphere. The positioning operating device 15 applies a least-square method, the LAMBDA method, and the Kalmann Filter to the regression equation. So the positioning operating device 15 estimates a position of the mobile station 1 (S5).

Next described below is a detail relating to an estimation algorithm which estimates the position of the mobile station 1. In a description below we put the carrier phase integrated values to the carrier phases.

For the receiver u (the mobile station 1) an observation equation of the carrier phases $\phi^p_{L,u}$ is described by an expression (1), and an observation equation of the code pseudorange $\rho^p_{L,u}$ is described by an expression (2).

Meanwhile, an error of a multipath is so small that we could ignore the multipath.

[Expression 1]

$$\varphi^p_{L,u}(t) = \frac{1}{\lambda_L}\{r^p_u(t, t-\tau^p_u) - \delta I^p_{L,u}(t) + \delta T^p_u(t) + c[\delta t_u(t) - \delta t^p(t-\tau^p_u)]\} + \quad (1)$$

$$N^p_{L,u} + \varepsilon^p_{L,u}(t)$$

$$\rho^p_{c,u}(t) = r^p_u(t, t-\tau^p_u) + \delta I^p_{L,u}(t) + \delta T^p_u(t) + c[\delta t_u(t) - \delta t^p(t-\tau^p_u)] + e^p_{c,u}(t) \quad (2)$$

where $\lambda_L$ is a wavelength of L carrier wave, $r^p_u(t,t-\tau^p_u)$ is a geometric distance between the receiver u at the time t and the satellite p at the time $t-\tau^p_u$. $\tau^p_u$ denotes a travel time from the satellite p to the receiver u. $\delta I^p_{L,u}(t)$ is a delay of the ionosphere to the L1 carrier wave, $\delta T^p_u(t)$ is a delay of the troposphere to the L1 and L2 carrier wave. $\delta t_u(t)$ is a clock error of the receiver at the true time t, $\delta t^p(t-\tau^p_u)$ is a clock error of the GPS satellite p at the time $t-\tau^p_u$. $N^p_{L,u}$ is an integer ambiguity concerned with the distance between the receiver u and the satellite p, $\varepsilon^p_{L,u}(t)$, $e^p_{L,u}(t)$ are the observation noises respectively.

And define $\Phi^p_{L,u}=\lambda_L\phi^p_{L,u}$, $f_{L1}$ is a frequency of the L1 carrier wave, $f_{L2}$ is a frequency of the L2 carrier wave.

Applying these definition to the expression (1)-(2), the observation equation of the CA code pseudorange $\rho^p_{CA,u}$ is re-described by an expression (3), the observation equation of the P,Y code pseudorange $\rho^p_{CA,u}$ is re-described by an expression (4). And the observation equation of the L1 carrier phase $\Phi^p_{L1,u}$ is re-described by an expression (5), the observation equation of the L2 carrier phase $\Phi^p_{L2,u}$ is re-described by an expression (6).

[Expression 2]

$$\rho^p_{CA,u}(t) = \quad (3)$$

$$r^p_u(t, t-\tau^p_u) + \delta I^p_u(t) + \delta T^p_u(t) + c[\delta t_u(t) - \delta t^p(t-\tau^p_u)] + e^p_{CA,u}(t)$$

$$\rho^p_{P,u}(t) = \quad (4)$$

$$r^p_u(t, t-\tau^p_u) + \frac{f^2_{L1}}{f^2_{L2}}\delta I^p_u(t) + \delta T^p_u(t) + c[\delta t_u(t) - \delta t^p(t-\tau^p_u)] + e^p_{P,u}(t)$$

$$\Phi^p_{L1,u}(t) = r^p_u(t, t-\tau^p_u) - \delta I^p_u(t) + \delta T^p_u(t) + \quad (5)$$

$$c[\delta t_u(t) - \delta t^p(t-\tau^p_u)] + \lambda_{L1}N^p_{L1,u} + \lambda_{L1}\varepsilon^p_{L1,u}(t)$$

$$\Phi^p_{L2,u}(t) = r^p_u(t, t-\tau^p_u) - \frac{f^2_{L1}}{f^2_{L2}}\delta I^p_u(t) + \delta T^p_u(t) + \quad (6)$$

$$c[\delta t_u(t) - \delta t^p(t-\tau^p_u)] + \lambda_{L2}N^p_{L2,u} + \lambda_{L2}\varepsilon^p_{L2,u}(t)$$

And the distance $r^p_u(t, t-\tau^p_u)$ between the receiver u and the GPS satellite p is re-described by an expression (7).

[Expression 3]

$$r^p_u(t) \equiv r^p_u(t, t - \tau^p_u) \\ = \sqrt{(x_u(t) - x^p(t - \tau^p_u))^2 + (y_u(t) - y^p(t - \tau^p_u))^2 + (z_u(t) - z^p(t - \tau^p_u))^2} \quad (7)$$

At this point we transpose an unknown receiver's position $u(t)=[x_u(t),y_u(t),z_u(t)]$ to a priori estimation of the receiver's position $u^{(j)}(t)=[x_u^{(j)}(t),y_u^{(j)}(t),z_u^{(j)}(t)]$ with j steps, and apply a Linear Taylor series expansion to the priori estimation of the receiver's position $u^{(j)}(t)$ with an estimated position $Se^p$ which derived from a satellite's position $S^p=[x^p,y^p,z^p]$ of the satellite p in three dimensions. And applying these methods, we apply a linear approximation to the distance $r^p_u(t)$.

[Expression 4]

$$r^p_u \cong r^p_{u(j)} + g^{p,(u)}[u - S - (u^{(j)} - Se^p)] \quad (8)$$

$$g^{p,(j)} \equiv \left[\frac{\partial r^p_{u(j)}}{\partial u^{(j)}}\right]^T \quad (9)$$

$$p = 1, 2, \ldots, n_s$$

We assign this linear approximation equation to the expression (3)-(6).

Expression 5]

$$\Phi e_{L,u}^{p,(j)} \equiv \Phi_{L,u}^{p,(j)} - [r_u^{(j)p} - g^{p,(j)}(u^{(j)} - Se^p)] \quad (10)$$

$$\rho e_{Code,u}^{p,(j)} \equiv \rho_{Code,u}^{p,(j)} - [r_u^{(j)p} - g^{p,(j)}(u^{(j)} - Se^p)]^{(j)} \quad (11)$$

And applying the expression (10),(11) derives a following expressions.

[Expression 6]

$$\rho e_{CA,u}^{p,(j)} \cong g^{p,(j)}u - g^{p,(j)}Se^p + \delta I^p_u + \delta T^p_u + c[\delta t_u - \delta t^p] + e^p_{CA,u} \quad (12)$$

$$\rho e_{P,u}^{p,(j)} \cong g^{p,(j)}u - g^{p,(j)}Se^p + \frac{f^2_1}{f^2_2}\delta I^p_u + \delta T^p_u + c[\delta t_u - \delta t^p] + e^p_{P,u} \quad (13)$$

$$\Phi e_{L1,u}^{p,(j)} \cong \\ g^{p,(j)}u - g^{p,(j)}Se^p - \delta I^p_u + \delta T^p_u + c(\delta t_u - \delta t^p) + \lambda_{L1}N^p_{L1,u} + \lambda_{L1}\varepsilon^p_{L1,u} \quad (14)$$

$$\Phi e_{L2,u}^{p,(j)} \cong g^{p,(j)}u - g^{p,(j)}Se^p - \frac{f^2_{L1}}{f^2_{L2}}\delta I^p_u + \\ \delta T^p_u + c(\delta t_u - \delta t^p) + \lambda_{L2}N^p_{L2,u} + \lambda_{L2}\varepsilon^p_{L2,u} \quad (15)$$

These expressions (12)-(15) denotes the approximate linear regression equations that are comprised of some objective variables and some explanatory variables. The objective variables include the carrier phases, the code pseudoranges. The explanatory variables include the receiver's position, the delay of the ionosphere, the delay of the troposphere, the integer ambiguity.

Define the matrixes which include the linear approximated elements as the expression below.

[Expression 7]

$$G_n^{(j)} = \begin{bmatrix} \frac{\partial r^1_{u(j)}}{\partial x_u^{(j)}} & \frac{\partial r^1_{u(j)}}{\partial y_u^{(j)}} & \frac{\partial r^1_{u(j)}}{\partial z_u^{(j)}} \\ \frac{\partial r^2_{u(j)}}{\partial x_u^{(j)}} & \frac{\partial r^2_{u(j)}}{\partial y_u^{(j)}} & \frac{\partial r^2_{u(j)}}{\partial z_u^{(j)}} \\ \ldots & \ldots & \ldots \\ \frac{\partial r^{n_s}_{u(j)}}{\partial x_u^{(j)}} & \frac{\partial r^{n_s}_{u(j)}}{\partial y_u^{(j)}} & \frac{\partial r^{n_s}_{u(j)}}{\partial z_u^{(j)}} \end{bmatrix} = \begin{bmatrix} g^1_u \\ g^2_u \\ \vdots \\ g^{n_s}_u \end{bmatrix} \quad (16)$$

$$G_{D,u}^{(j)} = \begin{bmatrix} g^1_u & 0 & \ldots & \ldots & 0 \\ 0 & g^2_u & 0 & & 0 \\ \ldots & & \ldots & & \ldots \\ \ldots & & & \ldots & \ldots \\ 0 & \ldots & \ldots & 0 & g^{n_s}_u \end{bmatrix} \quad (17)$$

And we expresses the position of the satellite pi in three dimensions as $pi=[x^p_i, y^p_i, z^p_i]^T$ and a group of all satellites' positions in three dimensions as $s=[pT1, pT2, , pTns]T$. So the expression (12)-(15) are re-described to a following vectorial determinant.

[Expression 8]

$$\begin{bmatrix} \rho e_{CA,u}^{(j)} \\ \rho e_{PY,u}^{(j)} \\ \Phi e_{L1,u}^{(j)} \\ \Phi e_{L2,u}^{(j)} \end{bmatrix} = \begin{bmatrix} G_u^{(j)} & 1 & 0 & 0 & -G_{D,u}^{(j)} & -I & I & I \\ G_u^{(j)} & 1 & 0 & 0 & -G_{D,u}^{(j)} & -I & \frac{f^2_{L1}}{f^2_{L2}}I & I \\ G_u^{(j)} & 1 & I & 0 & -G_{D,u}^{(j)} & -I & -I & I \\ G_u^{(j)} & 1 & 0 & I & -G_{D,u}^{(j)} & -I & -\frac{f^2_{L1}}{f^2_{L2}} & I \end{bmatrix} \quad (18)$$

$$\begin{bmatrix} u \\ c\delta t_u \\ \lambda_{L1}N_{L1,u} \\ \lambda_{L2}N_{L2,u} \\ s \\ c\delta t^s \\ \delta I_u \\ \delta T_u \end{bmatrix} + \begin{bmatrix} e^s_{CA,u} \\ e^s_{PY,u} \\ \lambda_{L1}\varepsilon^s_{L1,u} \\ \lambda_{L2}\varepsilon^s_{L2,u} \end{bmatrix}$$

For the known position k (the base-station 2) an observation equation of the carrier phases $\phi^p_{L,k}$ is described by an expression (19), and an observation equation of the code pseudorange $\rho^p_{L,k}$ is described by an expression (20).

[Expression 9]

$$\varphi_{L,k}^p(t) = \frac{1}{\lambda_L}\{r_k^p(t, t-\tau_k^p) - \delta I_{L,k}^p(t) + \delta T_k^p(t) + c[\delta t_k(t) - \delta t^p(t-\tau_k^p)]\} + \quad (19)$$
$$N_{L,k}^p + \varepsilon_{L,k}^p(t)$$

$$\rho_{c,k}^p(t) = \quad (20)$$
$$r_k^p(t, t-\tau_k^p) + \delta I_{L,k}^p(t) + \delta T_k^p(t) + c[\delta t_k(t) - \delta t^p(t-\tau_k^p)] + e_{c,k}^p(t)$$

Utilizing these observation equations, the regression equation of the known position k is derived in the same way to derive the regression equation of the receiver u. The position of the base-station 2 is already known, so the element of the receiver's position u is not included in the expression (18). Consequently the regression equation of the base-station expressed by determinant is derived to a following expression.

[Expression 10]

$$\begin{bmatrix} \rho he_{CA,k}^{(j)} \\ \rho he_{PY,k}^{(j)} \\ \Phi he_{L1,k}^{(j)} \\ \Phi he_{L2,k}^{(j)} \end{bmatrix} = \begin{bmatrix} 1 & 0 & 0 & -G_{D,k}^{(j)} & -1 & 1 & 1 \\ 1 & 0 & 0 & -G_{D,k}^{(j)} & -1 & \frac{f_{L1}^2}{f_{L2}^2}1 & 1 \\ 1 & 1 & 0 & -G_{D,k}^{(j)} & -1 & -1 & 1 \\ 1 & 0 & 1 & -G_{D,k}^{(j)} & -1 & -\frac{f_{L1}^2}{f_{L2}^2}1 & 1 \end{bmatrix} \quad (21)$$

$$\begin{bmatrix} c\delta t_k \\ \lambda_{L1} N_{L1,k} \\ \lambda_{L2} N_{L2,k} \\ s \\ c\delta t^s \\ \delta I_k \\ \delta T_k \end{bmatrix} + \begin{bmatrix} e_{CA,k}^s \\ e_{PY,k}^s \\ \lambda_{L1} \varepsilon_{L1,k}^s \\ \lambda_{L2} \varepsilon_{L2,k}^s \end{bmatrix} \text{ where}$$

$$\begin{bmatrix} \rho he_{CA,k}^{(j)} \\ \rho he_{PY,k}^{(j)} \\ \Phi he_{L1,k}^{(j)} \\ \Phi he_{L2,k}^{(j)} \end{bmatrix} = \begin{bmatrix} \rho e_{CA,k}^{(j)} \\ \rho e_{PY,k}^{(j)} \\ \Phi e_{L1,k}^{(j)} \\ \Phi e_{L2,k}^{(j)} \end{bmatrix} - \begin{bmatrix} G_k^{(j)} \\ G_k^{(j)} \\ G_k^{(j)} \\ G_k^{(j)} \end{bmatrix} k$$

The regression equation (18) is derived by the observed values of the mobile station 1, and the regression equation (21) is derived by the observed values of the base-station 2. So applying the observed values of the base-station 2, the differential positioning at the mobile station 1 is enabled.

[Expression 11]

$$\begin{bmatrix} \rho e_{CA,u}^{(j)} \\ \rho e_{PY,u}^{(j)} \\ \Phi e_{L1,u}^{(j)} \\ \Phi e_{L2,u}^{(j)} \\ \rho he_{CA,k}^{(j)} \\ \rho he_{PY,k}^{(j)} \\ \Phi he_{L1,k}^{(j)} \\ \Phi he_{L2,k}^{(j)} \end{bmatrix} = \quad (22)$$

$$\begin{bmatrix} G_u^{(j)} & 1 & 0 & 0 & -G_{D,u}^{(j)} & -1 & 1 & 1 & 0 & 0 & 0 & 0 \\ G_u^{(j)} & 1 & 0 & 0 & -G_{D,u}^{(j)} & -1 & \frac{f_{L1}^2}{f_{L2}^2}1 & 1 & 0 & 0 & 0 & 0 \\ G_u^{(j)} & 1 & 1 & 0 & -G_{D,u}^{(j)} & -1 & -1 & 1 & 0 & 0 & 0 & 0 \\ G_u^{(j)} & 1 & 0 & 1 & G_{D,u}^{(j)} & -1 & -\frac{f_{L1}^2}{f_{L2}^2}1 & 1 & 0 & 0 & 0 & 0 \\ 0 & 0 & 0 & 0 & -G_{D,u}^{(j)} & -1 & 0 & 0 & 1 & 0 & 0 & 1 & 1 \\ 0 & 0 & 0 & 0 & -G_{D,u}^{(j)} & -1 & 0 & 0 & 1 & 0 & 0 & \frac{f_{L1}^2}{f_{L2}^2}1 & 1 \\ 0 & 0 & 0 & 0 & -G_{D,u}^{(j)} & -1 & 0 & 0 & 1 & 1 & 0 & -1 & 1 \\ 0 & 0 & 0 & 0 & -G_{D,u}^{(j)} & -1 & 0 & 0 & 1 & 0 & 1 & -\frac{f_{L1}^2}{f_{L2}^2}1 & 1 \end{bmatrix}$$

$$\begin{bmatrix} u \\ c\delta t_u \\ \lambda_{L1} N_{L1,u} \\ \lambda_{L2} N_{L2,u} \\ s \\ c\delta t^s \\ \delta I_u \\ \delta T_u \\ c\delta t_k \\ \lambda_{L1} N_{L1,k} \\ \lambda_{L2} N_{L2,k} \\ \delta I_k \\ \delta T_k \end{bmatrix} + \begin{bmatrix} e_{CA,u}^s \\ e_{PY,u}^s \\ \lambda_{L1} \varepsilon_{L1,u}^s \\ \lambda_{L2} \varepsilon_{L2,u}^s \\ e_{CA,k}^s \\ e_{PY,k}^s \\ \lambda_{L1} \varepsilon_{L1,k}^s \\ \lambda_{L2} \varepsilon_{L2,k}^s \end{bmatrix}$$

Applying a least-square method, a Kalmann Filter, and more applying the integer ambiguity estimation method such as the LAMBDA method, an unknown values including the receiver's position u, the clock error of the receiver $\delta t_u$, the satellites' positions s, the clock error of the satellites $\delta t^s$, the delays of the ionosphere $\delta I_u$, $\delta I_k$, the delays of the troposphere $\delta T_u$, $\delta T_k$ could be estimated. In this estimation we calculate the error covariance values of the estimation results of the expression (22). And the estimation results converge on condition that the error covariance values reduce under the predetermined values.

Applying this constitution and algorithm, the receiver's position could be estimated utilizing only one regression equation. Moreover applying the Kalmann Filter, and fixing the integer ambiguity with the integer ambiguity estimation method such as the LAMBDA method, the estimation result of the receiver's position could have higher accuracy. And this regression equation includes the receivers' positions as unknown values, so the receivers' position could be estimated with high accuracy, too.

In above description, using the observation value, the delays of the ionosphere $\delta I_u$, $\delta I_k$, the delays of the troposphere $\delta T_u$, $\delta T_k$ are estimated on setting each delay is respective. And the clock error of the receiver $\delta t_u$, the clock error of the base-station $\delta t_k$ are estimated respectively. But the delay of the ionosphere, the delay of the troposphere, the clock error could be applied to a single difference method.

Figure 4:
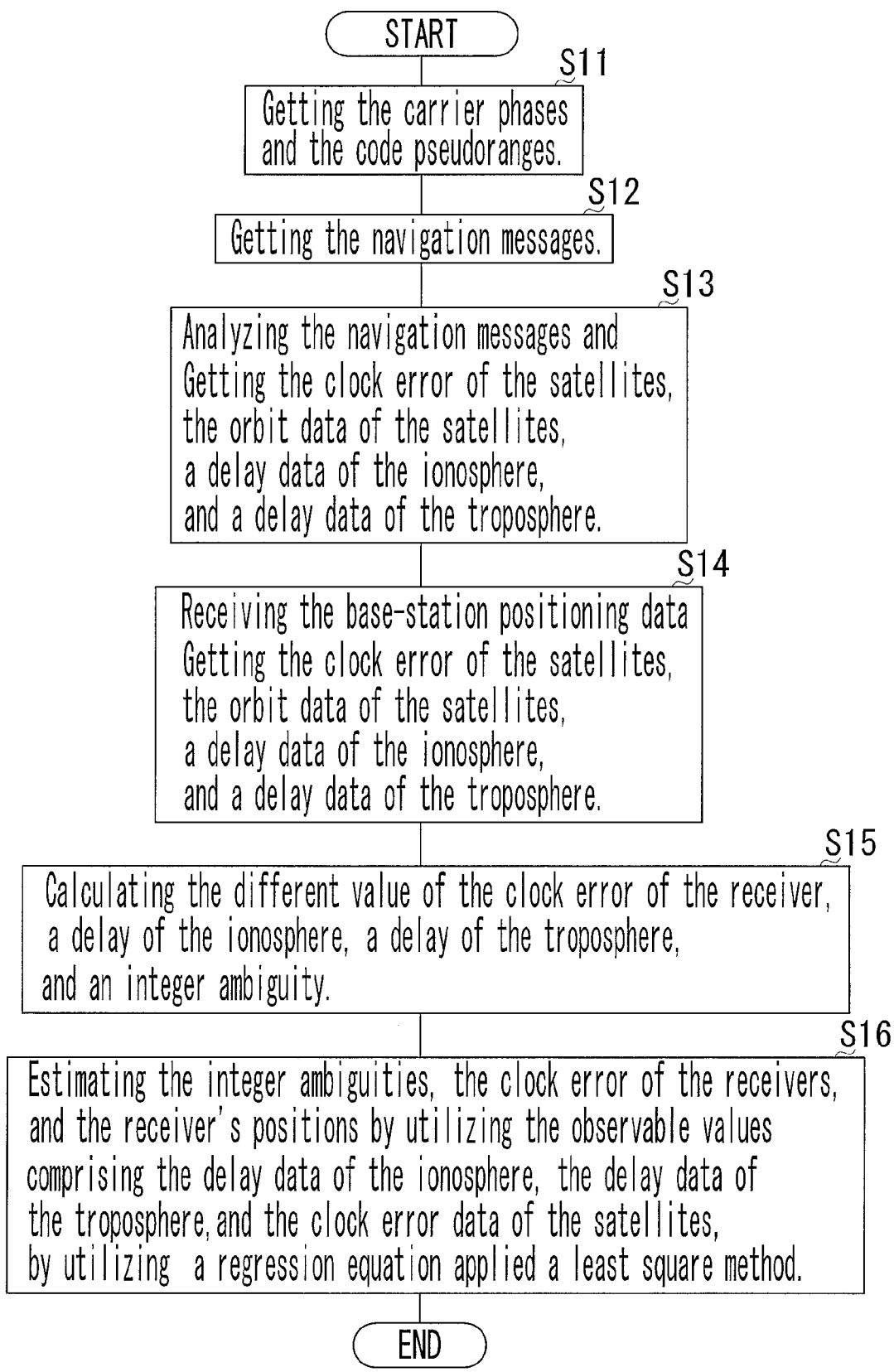
FIG. 4 is a flowchart illustrating the estimation process in the positioning apparatus utilizing the single difference method.

FIG. 4 is a flowchart illustrating the estimation process in the positioning apparatus utilizing the single difference method.

As shown FIG. 4, it is a occasion to use the single differential method, a flowchart from getting the carrier phase integration value and the code pseudorange to getting the clock errors of the satellites, the orbit data of the satellites, the delay data of the ionosphere, the delay data of the troposphere is same as the flowchart shown FIG. 3 (S11-S14). The positioning operating device 15 calculates the single difference between the clock error of the receiver $\delta t_u$ got by the satellite information processing device 13 and the clock error of the base-station $\delta t_k$ got by the base-station communication device 14. The positioning operating device 15 calculates the single difference between the delay of the ionosphere $\delta I_u$, got by the satellite information processing device 13 and the delay of the ionosphere $\delta I_k$ got by the base-station communication device 14. And the positioning operating device 15 calculates the single difference between the delay of the troposphere $\delta T_u$ got by the satellite information processing device 13 and the delay of the troposphere $\delta T_k$ got by the base-station communication device 14. The positioning operating device 15 calculates the single difference between the both carrier phase integration values $\Phi$. And the positioning operating device 15 calculates the single difference between the both code pseudoranges. Moreover the positioning operating device 15 calculates the single difference between the both integer ambiguities (S15).

The positioning operating device 15 transforms the regression equation described the expression (22).

[Expression 12]

$$\begin{bmatrix} \rho e_{CA,u}^{(j)} - \rho h e_{CA,k}^{(j)} \\ \rho e_{PY,u}^{(j)} - \rho h e_{PY,k}^{(j)} \\ \Phi e_{L1,u}^{(j)} - \Phi h e_{L1,k}^{(j)} \\ \Phi e_{L2,u}^{(j)} - \Phi h e_{L2,k}^{(j)} \end{bmatrix} = \begin{bmatrix} -G_u^{(j)} & -1 & 0 & 0 & G_{D,u}^{(j)} & -G_{D,k}^{(j)} & -I & -I \\ -G_u^{(j)} & -1 & 0 & 0 & G_{D,u}^{(j)} & -G_{D,k}^{(j)} & -\frac{f_{L1}^2}{f_{L2}^2}I & -I \\ -G_u^{(j)} & -1 & -I & 0 & G_{D,u}^{(j)} & -G_{D,k}^{(j)} & I & -I \\ -G_u^{(j)} & -1 & 0 & -I & G_{D,u}^{(j)} & -G_{D,k}^{(j)} & \frac{f_{L1}^2}{f_{L2}^2}I & -I \end{bmatrix} \begin{bmatrix} u \\ c\delta t_u - c\delta t_k \\ \lambda_{L1}(N_{L1,u} - N_{L1,k}) \\ \lambda_{L2}(N_{L2,u} - N_{L2,k}) \\ s \\ \delta I_u - \delta I_k \\ \delta T_u - \delta T_k \end{bmatrix} + \begin{bmatrix} e_{CA,uk}^s \\ e_{PY,uk}^s \\ \lambda_{L1}\varepsilon_{L1,uk}^s \\ \lambda_{L2}\varepsilon_{L2,uk}^s \end{bmatrix} \quad (23)$$

Applying the regression equation described an expression (23), and utilizing the same estimation process as the expression (22), the receiver's position u could be estimated (S16).

So applying the regression equation described the expression (23), the regression equation is simplified and the number of the unknown value is reduced.

At this time the number of the observable satellites configures $n_s$. As the delay data of the ionosphere, the delay data of the troposphere, the precious orbit data of the satellites could be got from the navigation message, and adding the number of the carrier phase integration value and the code pseudorange, the number of the observed values would be $9n_s$. Meanwhile the total number of the unknown values is $7n_s+4$ shown by the expression (23). It includes 3 in the receiver's position u, 1 in the single different of the clock error, $n_s$ in the single different of the L1 integer ambiguity, $n_s$ in the single different of the L2 integer ambiguity, $3n_s$ in the satellites' positions, each $n_s$ in the single different of the ionosphere and the troposphere. Consequently, if the condition of $9n_s>=7n_s+4$ is satisfied, the receiver's position u could be estimated. It means the condition of $n_s>=2$, if the number of the observable satellites is not less than 2, the receiver's position u could be estimated.

The embodiment described above show the differential positioning estimation whose base-station positioning data is got from the existing base-station. But if the distance between the mobile station and the existing base-station is long, the virtual base-station would be configured around the mobile station. And applying the base-station positioning data from the virtual base-station to the linear regression equation, the receiver's position u could be estimated.

Figure 5:
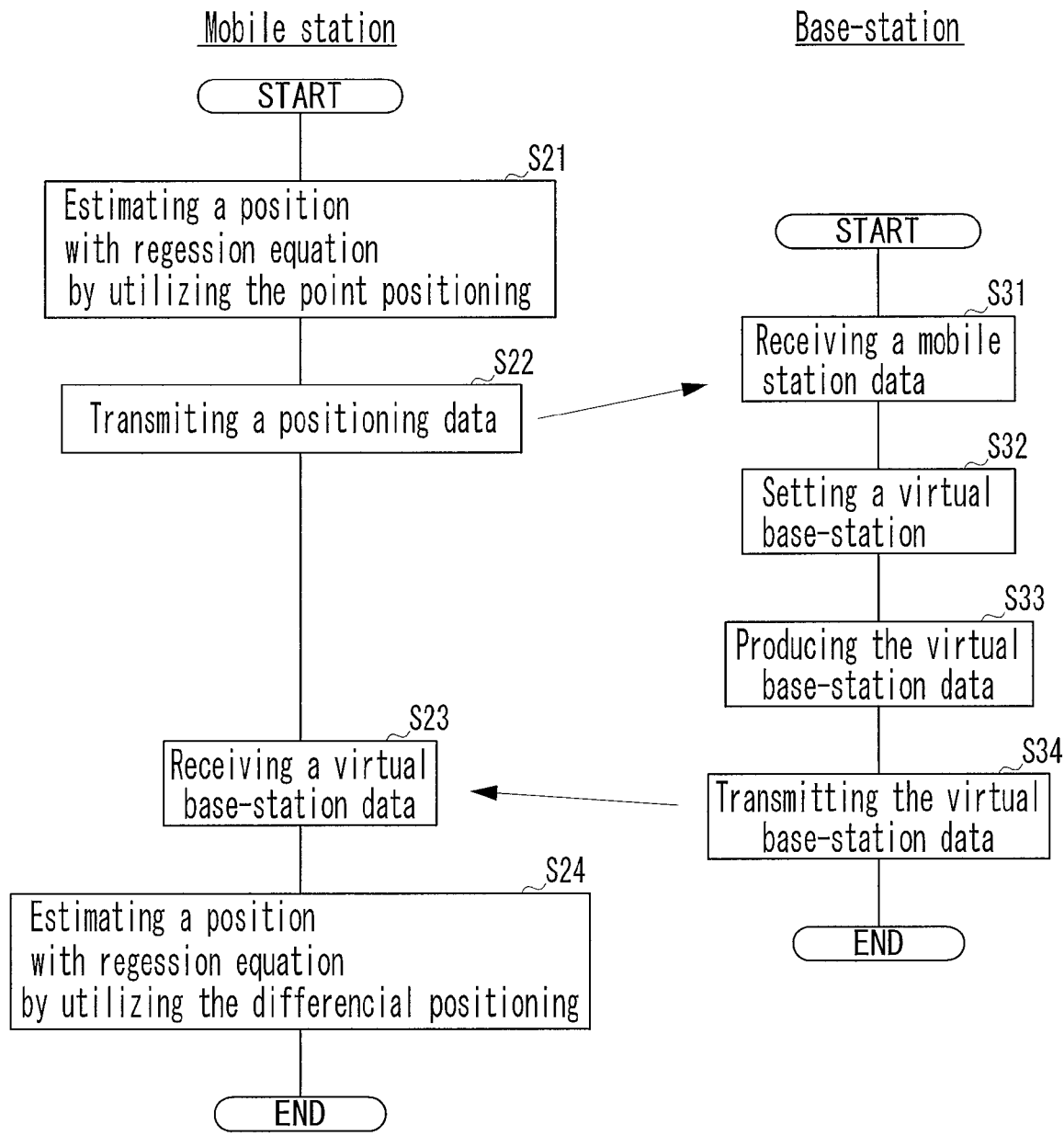
FIG. 5 is a flowchart illustrating the estimation process in the mobile station and the base-stations applying the virtual base-station.
Figure 6:
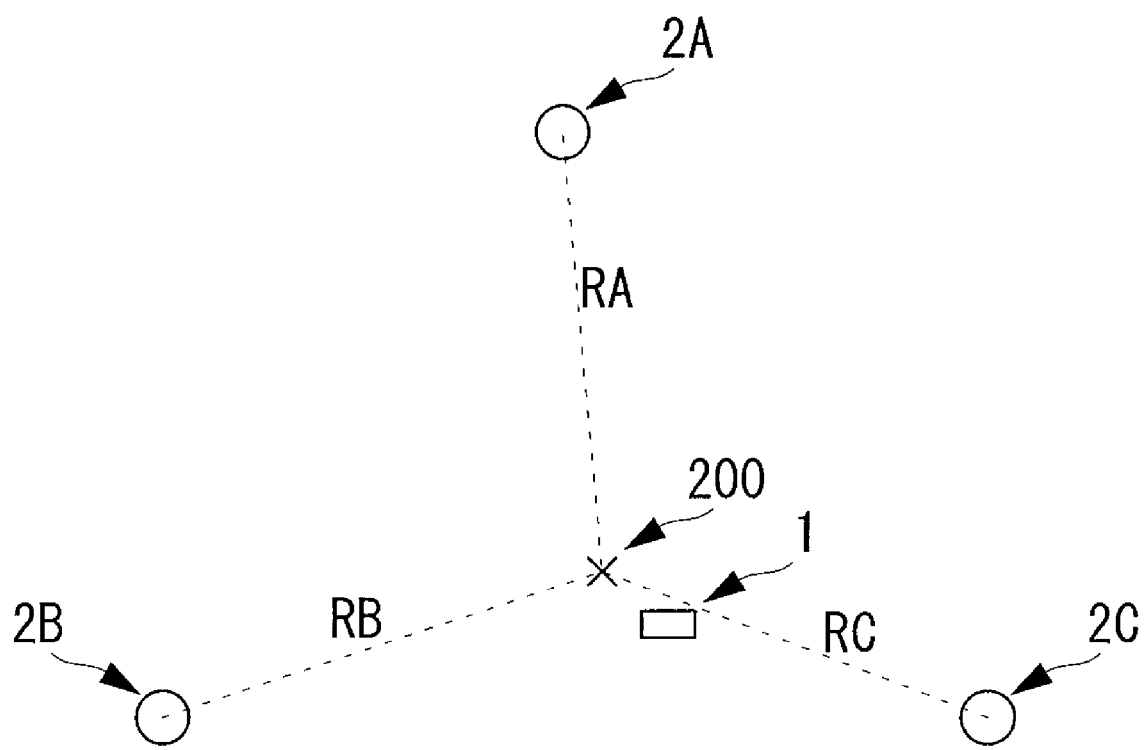
FIG. 6 is a conceptual diagram illustrating a positional relation of the existing base-station, the virtual base-station, and the mobile station.

FIG. 5 is a flowchart illustrating the estimation process in the mobile station and the base-stations applying the virtual base-station. FIG. 6 is a conceptual diagram illustrating a positional relation of the existing base-station, the virtual base-station, and the mobile station. As shown FIG. 6, the case that the mobile station 1 is far from all existing base-stations 2A-2C, the virtual base-station 200 is configured near the mobile station 1.

In this instance the mobile station 1 estimates the own position by utilizing the point positioning method includes the linear regression equation described the expression (18) (S21). The mobile station 1 gets the positions of the existing base-stations, and it calculates the distances between own position and the positions of the existing base-stations 2A-2C. The mobile station 1 detects the shortest of these distances. If the shortest distance is shorter than predetermined threshold value, the mobile station 1 prepares to configure a virtual base-station. The mobile station 1 transmits the own position estimated by point positioning to the nearest existing base-station (S22). As shown in FIG. 6 the nearest base-station is the existing station 2C.

The existing base-station 2C gets the position of the mobile station 1 (S31), and gets the position, the delay data of the ionosphere, and the delay data of the troposphere of the other existing base-stations 2A, 2B. The existing base-station 2C sets the position of the virtual base-station 200 as the estimated position of the mobile station 1 by point positioning, and calculates the distances RA,RB,RC between the virtual base-station 200 and the existing base-station 2A-2C respectively (S32). Consequently by setting the position of the virtual base-station as the position of the mobile station 1 estimated by the point positioning, the position of the virtual base-station could be configured to be extremely near the position of the mobile station 1. The existing base-station 2C calculates a delay data of the ionosphere $\delta Iki$ of the virtual base-station 200 by using the delay data of the ionosphere $\delta Ika, \delta Ikb, \delta Ikc$ which are got own base-station, the existing base-stations 2A, 2B respectively. The delay data of the ionosphere $\delta Iki$ of the virtual base-station 200 is calculated by the addition of the values which are the multiplication the exponential in inverse of the distance RA,RB,RC and the delay data of the ionosphere δIka,δIkb,δIkc respectively. In other word, the delay data of the ionosphere δIki of the virtual base-station 200 is the value of the weighting addition of the delay data of the ionosphere δIka,δIkb,δIkc which are proportioned by the exponential in inverse of the distance between the virtual base-station and the existing base-station 2A-2C. In the same way, the delay data of the troposphere δTki of the virtual base-station 200 is the value of the weighting addition of the delay data of the troposphere δTka,δTkb, δTkc which are proportioned by the exponential in inverse of the distance between the virtual base-station and the existing base-station 2A-2C (S33).

[Expression 13]

$$\begin{bmatrix} \rho e_{CA,u}^{(j)} - \rho h e_{CA,k}^{(j)} \\ \rho e_{PY,u}^{(j)} - \rho h e_{PY,k}^{(j)} \\ \Phi e_{L1,u}^{(j)} - \Phi h e_{L1,k}^{(j)} \\ \Phi e_{L2,u}^{(j)} - \Phi h e_{L2,k}^{(j)} \end{bmatrix} = \tag{23}$$

$$\begin{bmatrix} -G_u^{(j)} & -1 & 0 & 0 & G_{D,u}^{(j)} & -G_{D,k}^{(j)} & -I & -I \\ -G_u^{(j)} & -1 & 0 & 0 & G_{D,u}^{(j)} & -G_{D,k}^{(j)} & -\frac{f_{L1}^2}{f_{L2}^2}I & -I \\ -G_u^{(j)} & -1 & -I & 0 & G_{D,u}^{(j)} & -G_{D,k}^{(j)} & I & -I \\ -G_u^{(j)} & -1 & 0 & -I & G_{D,u}^{(j)} & -G_{D,k}^{(j)} & \frac{f_{L1}^2}{f_{L2}^2}I & -I \end{bmatrix}$$

$$\begin{bmatrix} u \\ c\delta t_u - c\delta t_k \\ \lambda_{L1}(N_{L1,u} - N_{L1,k}) \\ \lambda_{L2}(N_{L2,u} - N_{L2,k}) \\ s \\ \delta I_u - \delta I_k \\ \delta T_u - \delta T_k \end{bmatrix} + \begin{bmatrix} e_{CA,uk}^s \\ e_{PY,uk}^s \\ \lambda_{L1}\varepsilon_{L1,uk}^s \\ \lambda_{L2}\varepsilon_{L2,uk}^s \end{bmatrix}$$

The existing base-station 2C estimates the data concerned to the satellite at the position of the virtual base-station 200 by utilizing the data concerned to the satellite which includes the satellites' positions and the clock errors of the satellites got by the existing base-station 2A-2C. The existing base-station 2C estimates the code pseudorange and the carrier phase integration value for the virtual base-station 200 by utilizing the code pseudoranges and the carrier phase integration values of the existing base-station 2A-2C.

The existing base-station 2C transmits a virtual base-station positioning data including the delay data of the ionosphere δIki, the delay data of the troposphere δTki, and the other kind of data related to the virtual base-station (S34).

The mobile station 1 receives the virtual base-station positioning data transmitted from the virtual base-station 200 (S23), and estimates the position by utilizing the linear regression equation described in the expression (22) or (23) (S24).

Though the distance to the existing base-stations is long, applying this constitution and process of positioning, the virtual base-station could be set neat the mobile station. As the distance between the mobile station and the base-station is short, the estimation result of the mobile station could have high accuracy. Furthermore setting the positioning data of the virtual base-stations on the basis of the weights proportioned by the exponential in inverse of the distance between the virtual base-station and the existing base-station, the virtual base-station positioning data could have high accuracy, and the estimation result of the mobile station could higher accuracy.

In addition, in this embodiment the virtual base-station positioning data is generated by the nearest existing base-station from the virtual base-station, but the other existing base-station could produce the virtual base-station positioning data.

And this embodiment shows the way to set the virtual base-station near the mobile station. But if the position of the mobile station could be estimated, and the delay data of the ionosphere and troposphere could be transmitted, these delay data of the ionosphere and troposphere could be transmitted to the virtual base-station directly. In this case, the mobile station estimates the position by utilizing the linear regression equation described by the expression (2)-(6).

And in this embodiment the nearest existing base-station from the mobile station products the virtual base-station positioning data, but the mobile station could produce the virtual base-station positioning data.

In this case, the delay data of the ionosphere δIka,δIkb,δIkc and the delay data of the troposphere δTka,δTkb,δTkc would transmit to the mobile station. And utilizing the expression (13), the delay data of the ionosphere δIki and the delay data of the troposphere δTki of the near position of the mobile station would be calculated by the multiplication the exponential in inverse of the distance RA,RB,RC which is between the near position and the existing base-stations 2A-2C. Applying this setting, the amount of processing by the existing base-station could not be high and a plurality of the mobile station could estimate the position at the same time.

And without setting the virtual base-station, the position of the mobile station could be estimated directly with high accuracy by utilizing the following way.

One way is to do a differential positioning utilizing the expression (23) and the existing base-stations 2A-2C around the mobile station. And using the estimation results and the error covariance of each existing base-stations, the position of the mobile station could be estimated with high accuracy as the weighted estimation result.

The other way is to estimate the positions of the satellites in three dimension, the clock errors of the satellites, the delay data of the ionosphere, the delay data of the troposphere in the existing base-stations. By estimating the positions of the satellites in three dimension, the clock errors of the satellites, and the error variances of these, and applying the weighted least-square method, the positions of the satellites in three dimensions could be estimated in higher accuracy. The mobile station estimates the position by point positioning method. And the mobile station estimates the delay data of the ionosphere and the troposphere, utilizing the delay data of the ionosphere and the troposphere estimated the existing base-stations and the way of weighting by the multiplication the exponential in inverse of the distance. Applying the estimation result of these the position of the satellites in three dimension, the clock error of the satellites, the delay data of the ionosphere and troposphere to the expression (21), and applying the Kalmann Filter, the integer ambiguity estimation method such as the LAMBDA method, the position of the mobile station in three dimension could be estimated with high accuracy.

The invention claimed is:

1. A positioning apparatus comprising:
a satellite signal receiver which receives satellites' signals transmitted from the satellites, a base-station data receiver whose position is known, the base-station data receiver receiving a base-station positioning data from a base-station, and a position estimating device which:

observes code pseudoranges and carrier phase integration values at the satellite signal receiver and the satellites by utilizing satellite data got by the satellite signal receiver;

sets up unknown values which includes integer ambiguity at the satellite signal receiver and the base-station, clock errors at the satellite signal receiver and the base-station, delays of an ionosphere at the satellite signal receiver and the base-station, delays of an troposphere at the satellite signal receiver and the base-station, a position of the satellite signal receiver, and except a position of the base-station data receiver;

linear-approximates a position of the satellite signal receiver with a Linear Taylor series expansion about estimated positions of the satellite signal receiver;

sets up explanatory variables that include the integer ambiguities, the clock errors, the delays of the ionosphere, the delays of the troposphere, and the position of the satellite signal receiver;

sets up objective variables that include the carrier phase integration values, and the code pseudoranges observed by the satellite signal receiver and the base-station;

derives only one linear regression equation which includes the objective variables and the explanatory variables; and estimates the position of the satellite signal receiver.

2. The positioning apparatus according to claim 1,
wherein the position estimating device fixes the integer ambiguity by using an estimation of the integer ambiguity such as the LAMBDA method, and estimates the position of the satellite signal receiver.

3. The positioning apparatus according claim 2,
wherein the position estimating device applies the Kalmann Filter to the linear regression equation.

4. The positioning apparatus according to claim 3,
wherein the position estimating device calculates a difference value of the integer ambiguities at the satellite signal receiver and the base-station, a difference value of the delay of the ionosphere at the satellite signal receiver and the base-station, and a difference value of the delay of the troposphere at the satellite signal receiver and the base-station, and apply at least one difference value to the linear regression equation.

5. A positioning system comprising:
the positioning apparatuses according to the claim 1,
wherein the base-station is a virtual base-station set near the positioning apparatus based on the base-station positioning data which are got at least three existing base-stations;

one of the existing base-station sets the unknown values and the observed values of the linear regression equation based on the estimated position of the satellite signal receiver; and the base-station data receiver receives data got from the existing base-station, the position estimating device estimates the position.

6. The positioning system according to the claim 5,
wherein the data related to the virtual base-station is set on the basis of the weights proportioned by the exponential in inverse of the distance between the virtual base-station and the existing base-station.

* * * * *